(12) United States Patent
Horsting et al.

(10) Patent No.: US 6,600,132 B2
(45) Date of Patent: Jul. 29, 2003

(54) METHOD AND APPARATUS TO GENERATE ORIFICE DISK ENTRY GEOMETRY

(76) Inventors: John James Horsting, 177 Dennis Dr., Williamsburg, VA (US) 23185; Mool Chand Gupta, 104 Barkdale Ct., Yorktown, VA (US) 23693

( * ) Notice: Subject to any disclaimer, the term of this patent is extended or adjusted under 35 U.S.C. 154(b) by 0 days.

(21) Appl. No.: 09/917,918

(22) Filed: Jul. 31, 2001

(65) Prior Publication Data

US 2003/0024911 A1 Feb. 6, 2003

(51) Int. Cl.$^7$ .......................... B23K 26/36; B23K 26/38
(52) U.S. Cl. .................................... 219/121.7
(58) Field of Search .................. 219/121.6, 121.67, 219/121.7, 121.71, 121.72, 121.85

(56) References Cited

U.S. PATENT DOCUMENTS

| | | | |
|---|---|---|---|
| 3,953,706 A | 4/1976 | Harris et al. ............. 219/121 L |
| 4,059,876 A | 11/1977 | Ditto ..................... 29/156.7 A |
| 4,160,894 A | 7/1979 | Stemmler et al. ......... 219/121 L |
| 4,370,540 A | 1/1983 | Davis et al. ......... 219/121 LM |
| 4,694,139 A | 9/1987 | Röder ......................... 219/121 |
| 4,818,834 A | 4/1989 | Rupert .................... 219/69.17 |
| 4,911,711 A | 3/1990 | Telfair et al. ................... 606/5 |
| 5,043,553 A | 8/1991 | Corfe et al. ............. 219/121.7 |
| 5,093,548 A | 3/1992 | Schmidt-Hebbel ..... 219/121.71 |
| 5,163,934 A | 11/1992 | Munnerlyn ..................... 606/5 |
| 5,237,148 A | 8/1993 | Aoki et al. .............. 219/121.7 |
| 5,523,544 A | 6/1996 | Hertzel et al. ........... 219/121.7 |
| 5,607,606 A | 3/1997 | Mori et al. ............ 219/121.67 |
| 5,632,083 A | 5/1997 | Tada et al. ..................... 29/827 |
| 5,885,199 A | 3/1999 | Shao ........................... 483/19 |
| 6,172,331 B1 | 1/2001 | Chen ..................... 219/212.71 |
| 6,229,113 B1 | 5/2001 | Brown ..................... 219/121.7 |
| 6,264,486 B1 | 7/2001 | Jiang et al. .................. 439/161 |

FOREIGN PATENT DOCUMENTS

| | | |
|---|---|---|
| GB | 2 328 894 | 3/1999 |
| JP | 409236066 A | * 9/1997 |

OTHER PUBLICATIONS

U.S. patent application No. 09/917,917, J. Horsting, filed Jul. 31, 2001, allowed.
U.S. patent application No. 09/909,974, C. Hamann, filed Jul. 23, 2001, allowed.

* cited by examiner

*Primary Examiner*—Samuel M. Heinrich

(57) ABSTRACT

A method of and apparatus for forming chamfers in an orifice of a workpiece. The orifice has an axis, which extends between a first surface and second surface of the workpiece, where the first and second surfaces are parallel to each other. The chamfers are disposed between the first surface and the second surface. The method includes forming an orifice in a workpiece with a source of non-collimated light directed at the workpiece at a predetermined first time interval, and forming a chamfer with a source of collimated light at a second time interval simultaneously with the first time interval. The apparatus includes at least a source of collimated and non-collimated light, a collimated light filter, and a non-collimated light generating arrangement, and at least one shutter and at least one iris that direct collimated and non-collimated light at the workpiece to form the orifice. The apparatus is configured such that the orifice has a surface roughness of between approximately 0.05 micron and approximately 0.13 micron and an orifice coefficient of greater than approximately 0.6.

19 Claims, 2 Drawing Sheets

METHOD AND APPARATUS TO GENERATE ORIFICE DISK ENTRY GEOMETRY

BACKGROUND OF THE INVENTION

Fuel flowing through a fuel injector typically exits at a nozzle end of the fuel injector. The nozzle end is believed to have a disk with at least one orifice to, in part, control the spray pattern and the direction of the fuel exiting the fuel injector.

The orifice is believed to be formed by drilling through a flat workpiece. The method of drilling orifices for fuel injector is believed to be electric discharge machining (EDM) that can form orifices of 150 to 200 microns in diameter. It is believed that one of the many disadvantages of EDM is the fact that the holes are typically formed without any favorable entry or exit geometry for the orifices, thereby affecting the flow through the orifices. It is further believed that EDM drilling for orifices smaller than 150 microns takes twice as long to complete. Moreover, it is believed that to maintain the same amount of fuel flow with the smaller orifice may require more than four times the number of the larger orifices. This is believed to reduce productivity in the manufacturing of the fuel injector. Additionally, it is believed that EDM forming of the orifices are not uniform between individual injectors, thereby causing the fuel injector spray to also be non-uniform between individual injectors.

Future emission standards for gasoline and diesel engines are believed to require the use of smaller orifices for smaller fuel spray droplets and shorter fuel spray duration. It is believed that fuel spray pattern and flow should remain uniform between adjacent cylinders in a multi-cylinder engine.

It is believed that smaller orifices can be formed with no loss in productivity through the use of lasers. At least two laser techniques are believed to be used for laser machining orifices. One is trepanning or helical drilling, the other is percussion drilling. Percussion drilling is believed to be less than desirable due to the random nature of metal heating and expulsion that most likely results in a non-cylindrical or non-circular orifice. Trepanning, on the other hand, is believed to be more precise as a center hole is believed to be initially formed before the formation of the orifice. Helical drilling is similar to trepanning but without the initial formation of a center hole. However, it is believed that neither trepanning nor percussion drilling provides for a desired formation of entry and exit geometry in the orifices.

SUMMARY OF THE INVENTION

The present invention provides for at least one method of forming chamfers and an orifice together while maintaining dimensional consistency between a plurality of orifices formed by the method. In one preferred embodiment of the invention, the method is achieved by providing a laser light source, extracting non-collimated light from the laser light source; extracting collimated light from the laser light source; forming at least one orifice in a workpiece with the collimated light directed at the workpiece at a predetermined first time interval; and forming at least one chamfer with the non-collimated at a second time interval simultaneous with the first time interval. The orifice formed by the method has an axis, which extends between a first surface and second surface of the workpiece, and the chamfers are disposed between the first surface and the second surface.

The present invention further provides an apparatus to form at least orifice and at least one chamfer in a workpiece together while maintaining dimensional consistency between a plurality of orifices. In a preferred embodiment, the apparatus includes at least a source of collimated and non-collimated light, a collimated light filtering assembly, a non-collimated light filtering assembly, and at least one shutter and at least one iris arrangements that direct collimated and non-collimated light at the workpiece to form the at least one chamfer and the at least one orifice which has an axis extending between a first surface and a second surface of the workpiece. The apparatus is configured such that at least one of the orifice and chamfer has a surface roughness of between approximately 0.05 microns and approximately 0.13 microns and a coefficient ratio of between approximately 0.6 and approximately 1.0.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENTS

Figure 1:
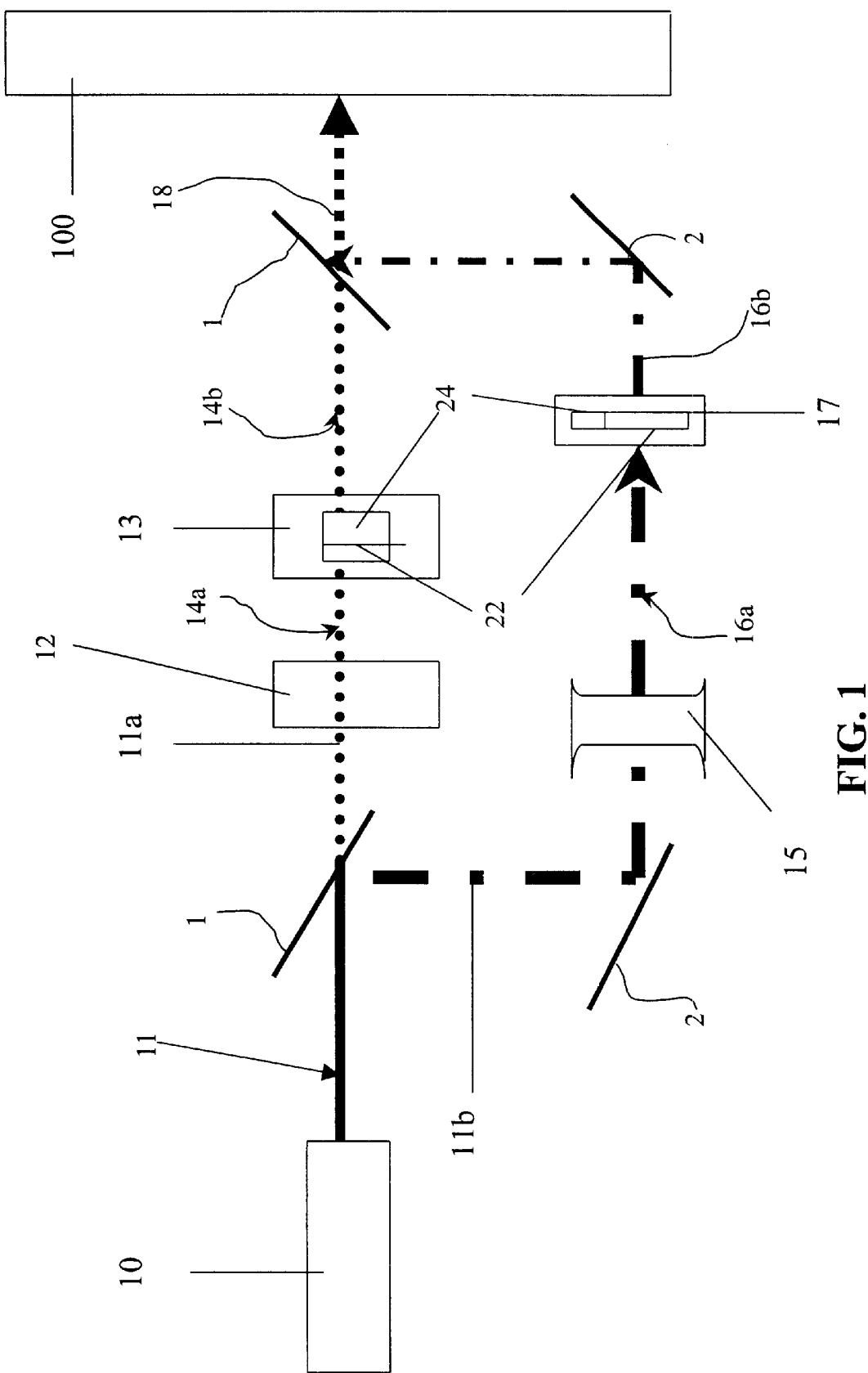
FIG. 1 is a schematic view of the components required to form an orifice according to a preferred embodiment.
Figure 2:
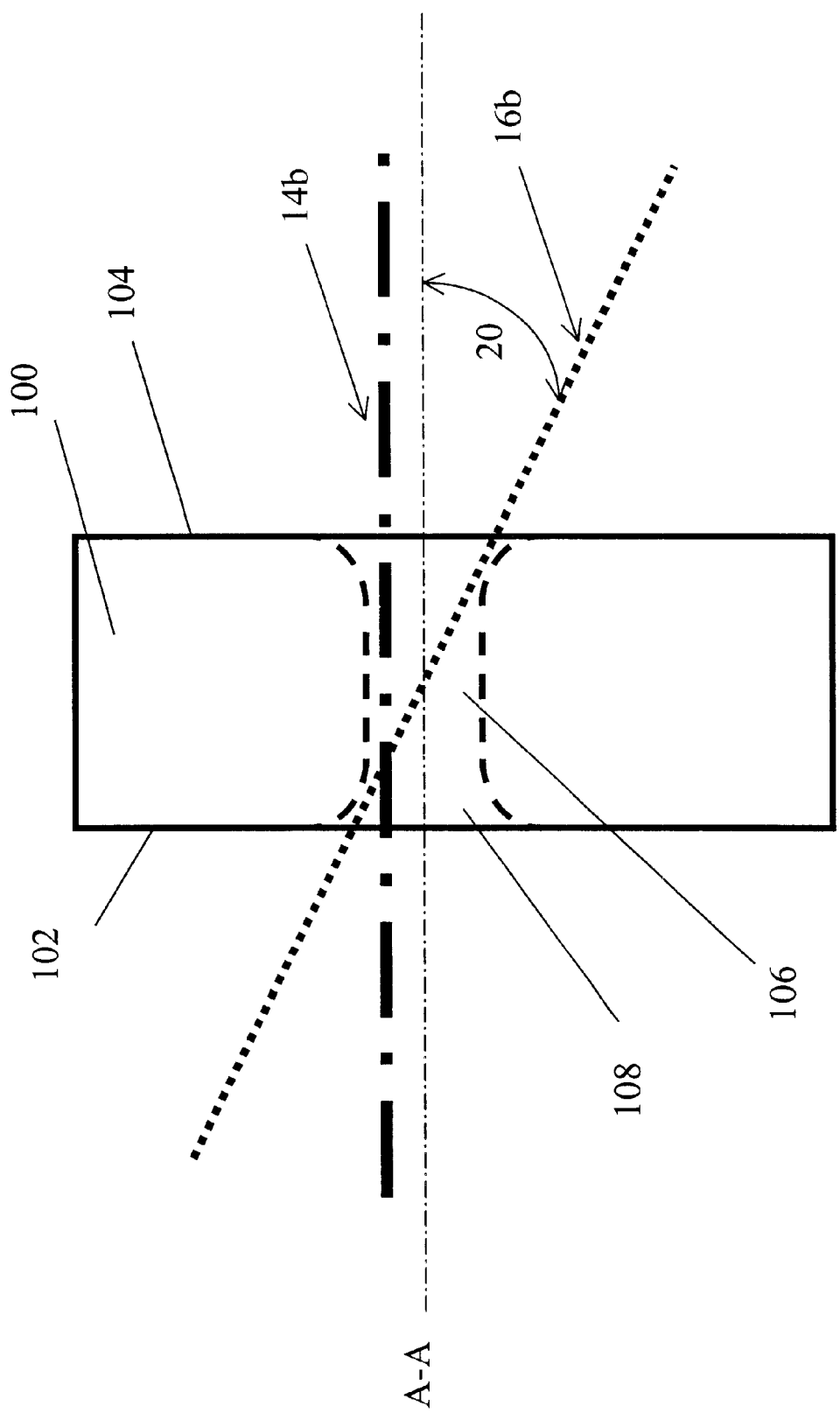
FIG. 2 is an illustration of the orifice and chamfer formed according to the preferred embodiment.

FIGS. 1 and 2 show a preferred embodiment that allows substantially simultaneous laser machining of at least one orifice and at least one chamfer in a work piece. Referring to FIG. 1, a laser light source 10 of both collimated and uncollimated light 11 is provided. Preferably, the laser light source 10 can be Model LM100 or LM150 sold by Oxford Laser™.

A partial reflector 1 splits the light 11 into two beams 11a and 11b of which collimated and uncollimated lights can be extracted. One of the many ways in which collimated light can be extracted from light beam 11a is by, for example, a first filter assembly 12, that can be an optical arrangement with a pinhole to remove non-collimated light that results in substantially collimated light 14a. The substantially collimated light 14a is delivered to a first power controlling assembly 13 that can be, for example, a shutter and iris assembly. The first power controlling assembly 13 that delivers a desired amount of power of collimated light 14b to the work piece 100.

The light 11b, on the other hand, is diverted by reflector 2 to a second filter assembly 15 that filters out collimated light to deliver mostly non-collimated light 16a to a second power controlling assembly 17. The second filter assembly 15 can be a beam expander, such as, for example, a diverging lens or focusing optics with a pinhole arrangement to filter out collimated light. The non-collimated light 16a that is filtered by filter 15 is delivered to the second power controlling assembly 17 that can be, for example, a shutter and iris arrangement to control the intensity or the power of the non-collimated light 16b.

The collimated light 14b and the non-collimated light 16b are delivered to another partial reflector 1 that, preferably, permits the lights 14b and 16b to combine into beam 18. In one preferred embodiment, the collimated light 14b can be controlled and directed at the workpiece 100 at a first time interval to form the orifice 106 while the non-collimated light 16b can be controlled and directed simultaneously to form the chamfer. The power density or irradiance of the respective collimated and uncollimated light can be regulated to define a ratio of collimated light to non-collimated light.

Preferably, the ratio of irradiance, or power density, between the collimated and non-collimated light 14b, 16b can be between approximately 1:1 to approximately 0.1:1, and the diameter of the non-collimated light 16b can be approximately 1 to approximately 2 times a diameter of the collimated light 14b. The laser light source 10 can be either a gas or a solid-state laser. Preferably, the power density of the laser light source 10 should be less than $1 \times 10^{12}$ Watts per centimeter-squared (1 Terawatt/cm$^2$) and at least $1 \times 10^6$ Watts per centimeter-squared (1 Megawatt/cm$^2$). Preferably, the laser light source 10 can be a copper vapor laser or a frequency doubled neodymium: yttrium-aluminum-garnet (Nd: YAG) laser having a wavelength between approximately 511 nanometer to approximately 578 nanometer.

Referring to FIG. 2, the orifice 106 has an axis A—A that extends between a first surface 102 and second surface 104 of the workpiece 100, where the first and second surfaces 102, 104 can be parallel to each other. Preferably, the first surface is parallel to the second surface. The at least one chamfer 108 can be disposed between the first surface 102 and the second surface 104. The orifice 106 preferably can be between approximately 20 microns and approximately 650 microns in diameter. As described herein, the term "chamfer" refers to a surface geometry of an orifice that can include an opening of the orifice or at any point between the first surface and the second surface of the at least one orifice. The surface geometry can be, for example, a square edge, a taper or a cone.

Using the preferred embodiments, it is believed that the surface roughness $R_a$ of the orifice 106 can be between approximately 0.05 microns and approximately 0.13 microns such that the surface roughness and the cross-sectional shape of the orifice or chamfer(s) result in an orifice coefficient between approximately 0.6 and approximately 1.0. As used here, the term "surface roughness $R_a$" is an arithmetic mean value of the absolute values of a surface profile divided by the quantity of the values sensed by a sensing instrument, such as, for example, a surface profilometer or even by optical scanning, including a laser type atomic force microscope.

It is believed that the optimum shape for chamfers 108 of the orifice 106 is bell shaped (as shown in FIG. 2), however, it can be configured into any cross-sectional shape that, under actual flow conditions, will produce an orifice coefficient of at least approximately 0.6. As used here, the term "orifice coefficient," or "coefficient of discharge", is a function of, among other variables, the ratio of the cross sectional area of the inlet with respect to the cross sectional area of the orifice itself as well as the Reynolds Number of the fluid flow through the orifice. The orifice coefficient is believed to be an indicator of frictional loss incurred by flow within an orifice.

In operation, the method can be practiced by an apparatus that forms an orifice 106 and chamfers 108 in a workpiece 100. The orifice has an axis A—A extending between a first surface 102 and a second surface 104 of the workpiece 100. The apparatus can be a laser light source 10 of collimated and non-collimated light 14b, 16b. By controlling the intensity of the collimated with respect to the non-collimated light and controlling the focus of the two types of light from a single source, the apparatus can be used to form at least one orifice 106 that has a surface roughness of between approximately 0.05 micron and approximately 0.13 micron and a coefficient ratio, inclusively, between approximately 0.6 and approximately 1.0. Preferably, the intensity of the laser source 10 can be approximately 0.3 milliJoules per pulse of the laser source 10.

The preferred embodiments described herein can be used to form orifices for use in fuel injectors. Other applications can include, for example, ink-jet printers and laser printers, microcircuits, micro-machined devices, or any other devices which require a plurality of orifices of consistent dimensionalities and a consistent orifice coefficient of at least approximately 0.6. The dimensionalities can be, for example, the diameter of the orifice or a plurality of diameters of the chamfer that can be used to describe the cross-sectional curve of the chamfer in three-dimension.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

We claim:

1. A method of forming chamfers and an orifice in a workpiece, the orifice having an axis extending between a first surface and second surface of the workpiece, the chamfers disposed between the first surfaces and the second surfaces, the method comprising:
   providing a laser light source having collimated and non-collimated light;
   extracting non-collimated light from the laser light source;
   extracting collimated light from the laser light source;
   forming at least one orifice in a workpiece with the collimated light directed at the workpiece at a predetermined first time interval; and
   forming at least one chamfer with the non-collimated light at a second time interval simultaneous with the first time interval.

2. The method of claim 1, wherein the providing further comprises controlling an intensity of at least one of the non-collimated light and collimated light.

3. The method according to claim 1, wherein a diameter of the at least one orifice comprises a diameter between approximately 20 microns and approximately 650 microns.

4. The method according to claim 2, wherein the controlling comprises varying at least one of the collimated and non-collimated lights as a function of a predetermined irradiance.

5. The method according to claim 1, wherein the controlling comprises varying one of the collimated and non-collimated lights as a function of a predetermined fluence.

6. The method according to claim 1, wherein a ratio of irradiance between the collimated and non-collimated light comprises a ratio between approximately 1 to 1 and approximately 0.1 to 1.

7. The method according to claim 1, wherein a power density of the collimated light comprises approximately 100% to approximately 200% of a power density of the non-collimated light.

8. The method according to claim 1, wherein the laser light source comprises at least one of a gas or a solid-state laser.

9. The method according to claim 1, wherein a wavelength of the laser light source comprises a wavelength between approximately 511 nanometer and approximately 578 nanometer.

10. The method according to claim 1, wherein a diameter of the non-collimated light comprises a diameter approximately 1 to approximately 2 times a diameter of the collimated light.

11. The method according to claim 1, wherein the surface roughness of the at least one orifice comprises a surface roughness between approximately 0.05 micron to approximately 0.13 micron.

12. The method according to claim 1, wherein the surface roughness of the at least one orifice is such that the orifice coefficient is, inclusively, between approximately 0.6 and approximately 1.0.

13. The method according to claim 1, wherein the providing further includes an optical filter, a collimated light generating arrangement, at least one shutter and at least one iris disposed between a laser light source and the workpiece.

14. An apparatus to form at least one orifice and at least one chamfer in a workpiece, the at least one orifice having an axis extending between a first surface and a second surface of the workpiece, the apparatus comprises:
　at least a source of collimated and non-collimated light;
　at least one collimated light filtering assembly;
　at least one non-collimated light filtering assembly; and
　at least one light controlling arrangement that directs collimated and non-collimated lights at the workpiece such that at least one of the orifice and the chamfer has a surface roughness of between approximately 0.05 micron and approximately 0.13 micron and a coefficient ratio of between approximately 0.6 and approximately 1.0.

15. The apparatus of claim 14, wherein the at least one orifice comprises an orifice having a diameter between approximately 20 microns and approximately 650 microns.

16. The apparatus of claim 14, wherein a wavelength of the at least a source of collimated and non-collimated light comprises a wavelength between approximately 511 nanometer and approximately 578 nanometer.

17. The apparatus of claim 14, wherein a diameter of the non-collimated light comprises a diameter approximately 1 to approximately 2 times a diameter of the collimated light.

18. The apparatus of claim 14, wherein the collimated light filtering assembly further includes an optical filter, a collimated light generating arrangement, at least one shutter and at least one iris disposed between a laser light source and the workpiece.

19. The apparatus of claim 14, wherein the non-collimated light filtering assembly further comprises at least one of a diverging lens and a focusing optic with pinhole arrangement.

\* \* \* \* \*